No. 633,014. Patented Sept. 12, 1899.
H. J. LAWSON.
MOTOR VEHICLE.
(Application filed Mar. 28, 1899.)
(No Model.) 7 Sheets—Sheet 2.

WITNESSES:

INVENTOR
Henry John Lawson
BY
Knight Bros
ATTORNEYS.

No. 633,014. Patented Sept. 12, 1899.
H. J. LAWSON.
MOTOR VEHICLE.
(Application filed Mar. 28, 1899.)

(No Model.) 7 Sheets—Sheet 4.

WITNESSES:
Herbert Bradley
Harry A Knight

INVENTOR
Henry John Lawson.
BY
Knight Bros
ATTORNEYS.

No. 633,014. Patented Sept. 12, 1899.
H. J. LAWSON.
MOTOR VEHICLE.
(Application filed Mar. 28, 1899.)

(No Model.) 7 Sheets—Sheet 5.

WITNESSES:
Herbert Bradley
Harry G. Knight

INVENTOR
Henry John Lawson
BY
Knight Bros
ATTORNEYS.

THE NORRIS PETERS CO., PHOTO-LITHO., WASHINGTON, D. C.

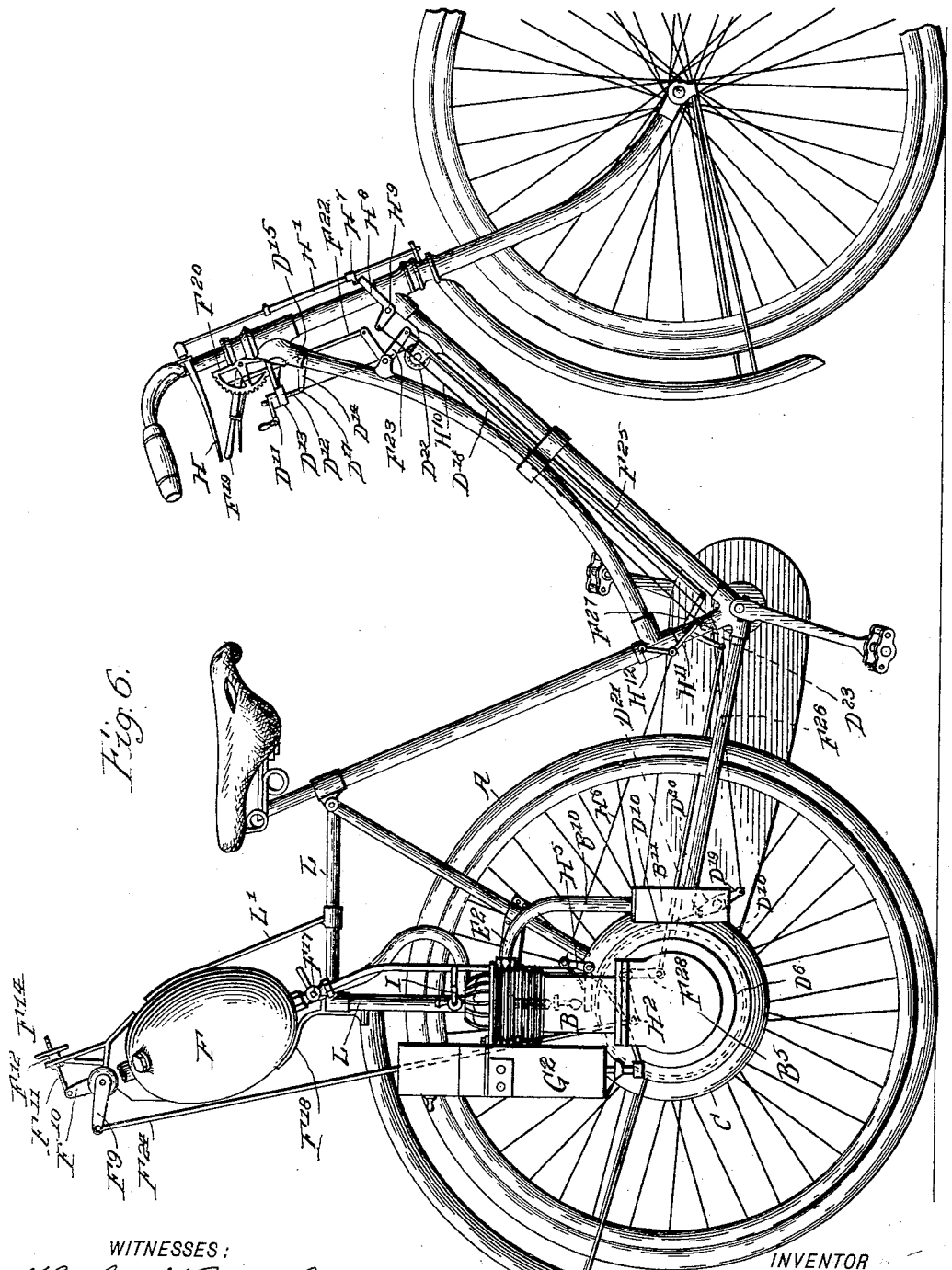

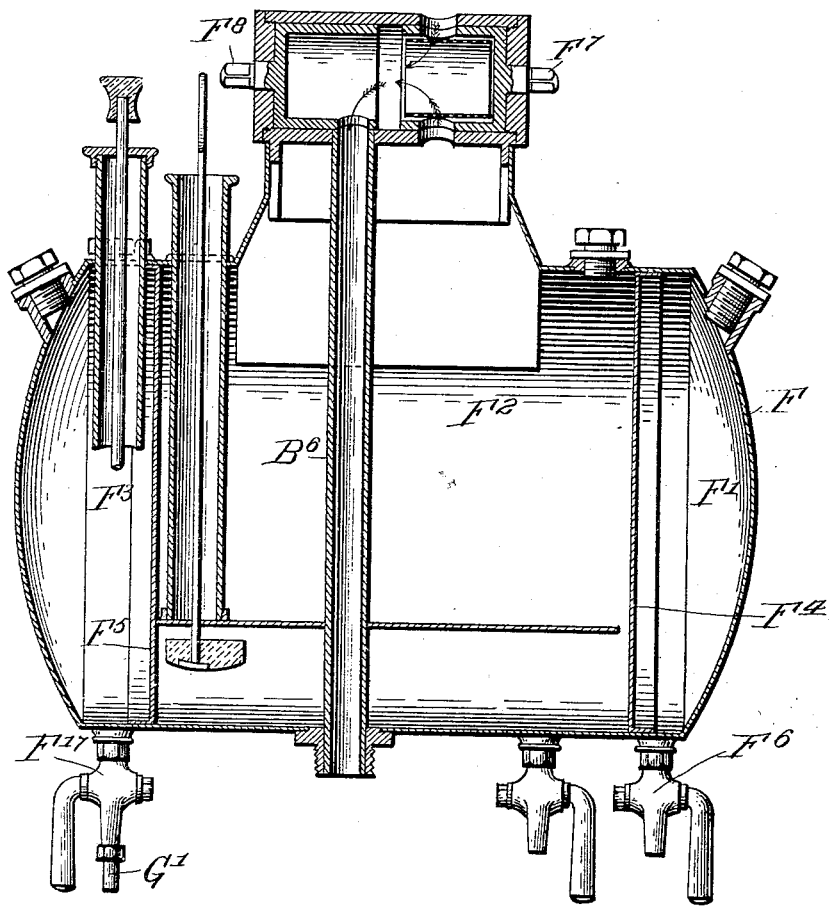

United States Patent Office.

HENRY JOHN LAWSON, OF LONDON, ENGLAND.

MOTOR-VEHICLE.

SPECIFICATION forming part of Letters Patent No. 633,014, dated September 12, 1899.

Application filed March 28, 1899. Serial No. 710,820. (No model.)

*To all whom it may concern:*

Be it known that I, HENRY JOHN LAWSON, a subject of the Queen of England, residing at London, England, have invented certain new and useful Improvements in or Relating to Motor-Driving Apparatus for Cycles and Like Vehicles, (for which I have made application for Letters Patent in Great Britain under No. 2,841, dated February 8, 1899,) of which the following is a specification.

The object of this invention is to construct a wheel with a motor and driving-gear attached which may be readily applied to any existing cycle-fork with as little alteration to the fork as possible, thus enabling the owner of a cycle to convert his machine into a motor-cycle at a comparatively small cost. This complete driving device will hereinafter be referred to as the "motor-wheel."

Although the above is the principal object of this invention the same form of motor-wheel may be made more heavily to suit other vehicles besides cycles and may, if desired, be used to drive other machinery instead of itself running upon the road.

The principal features of this invention are that the wheel hereinafter called the "driving" or "road" wheel is provided with a hollow axle or hub free to revolve in ball-bearings formed one at each end of the hub in a lug adapted for attachment to the blade of a cycle-fork. A motor is arranged on one side of the wheel, and the motor-shaft passing through the hollow hub of the wheel and extending beyond the farther side of the same is provided with a fly-wheel, which acts as a counterpoise to the motor. The motor-shaft is connected to and drives the road-wheel by means of a simple form of speed-reducing gear.

The invention has further reference to details connected with motor vehicles or cycles formed by the application of a motor-wheel to an ordinary cycle or vehicle.

The invention will be clearly understood by reference to the accompanying drawings, in which—

Figure 1:
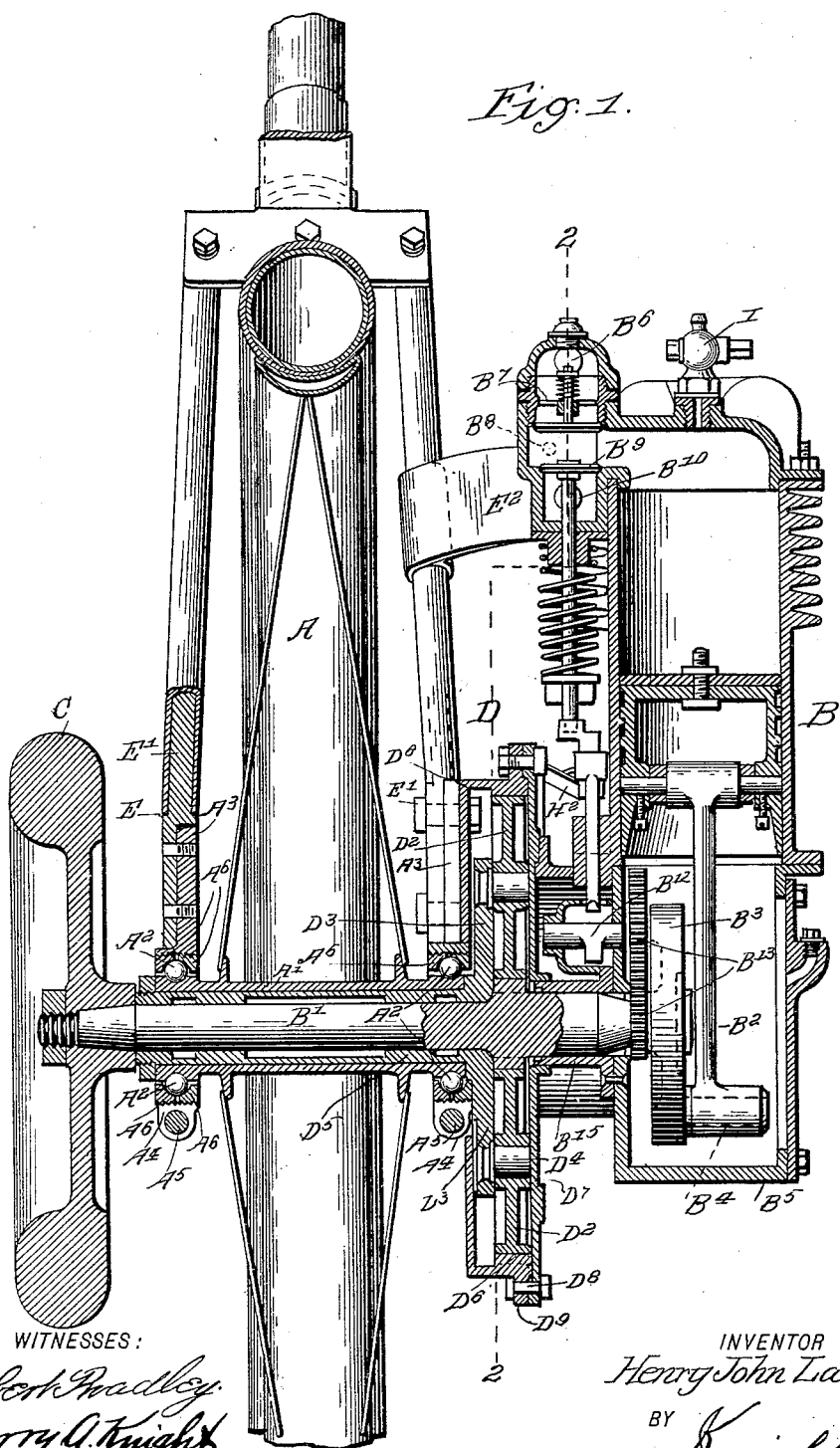
Figure 2:
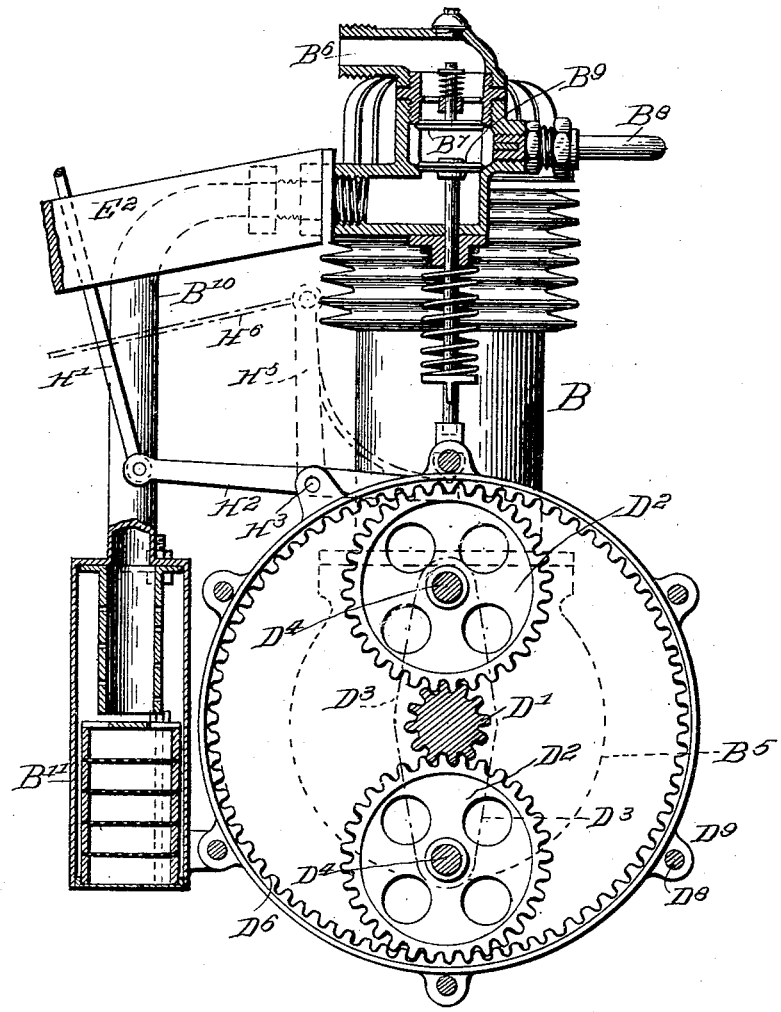
Figure 3:
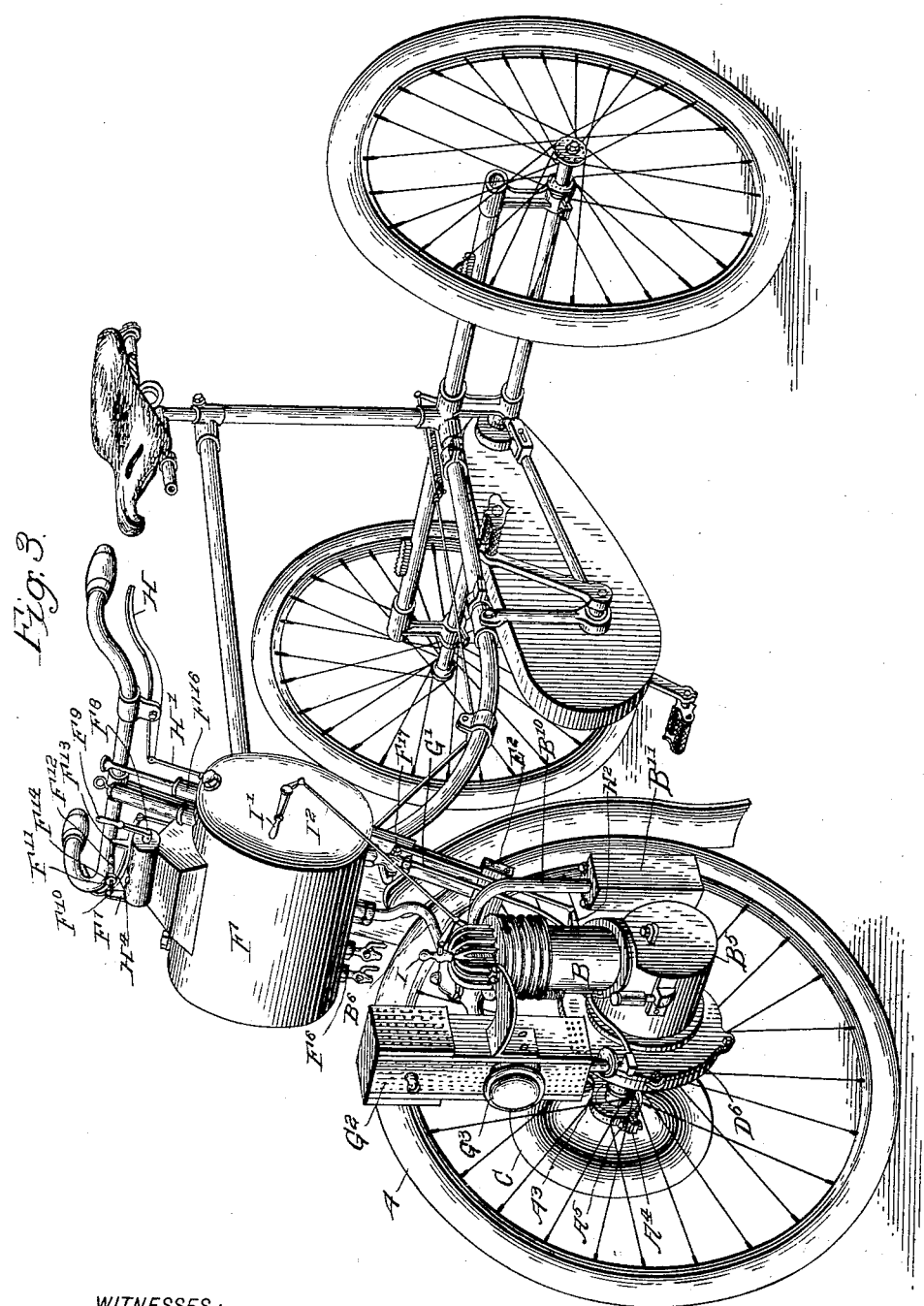
Figure 4:
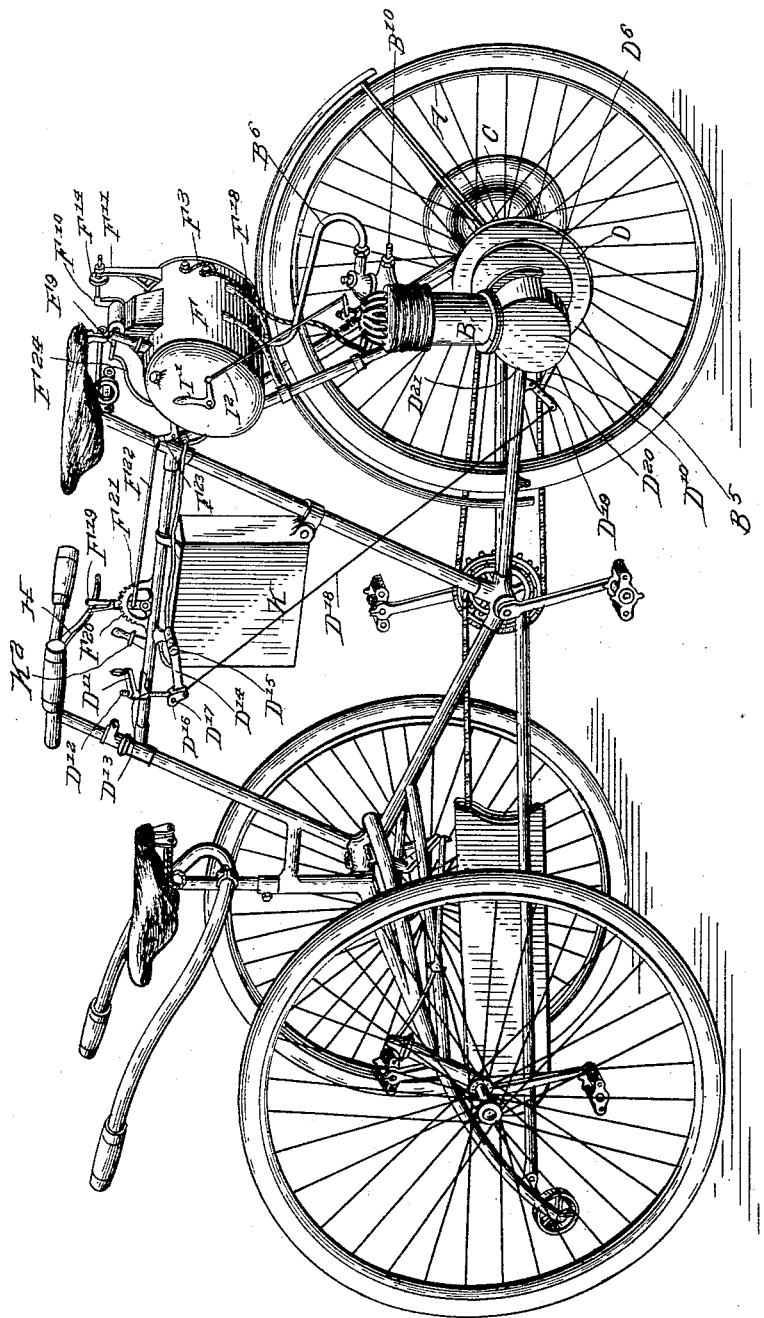
Figure 5:
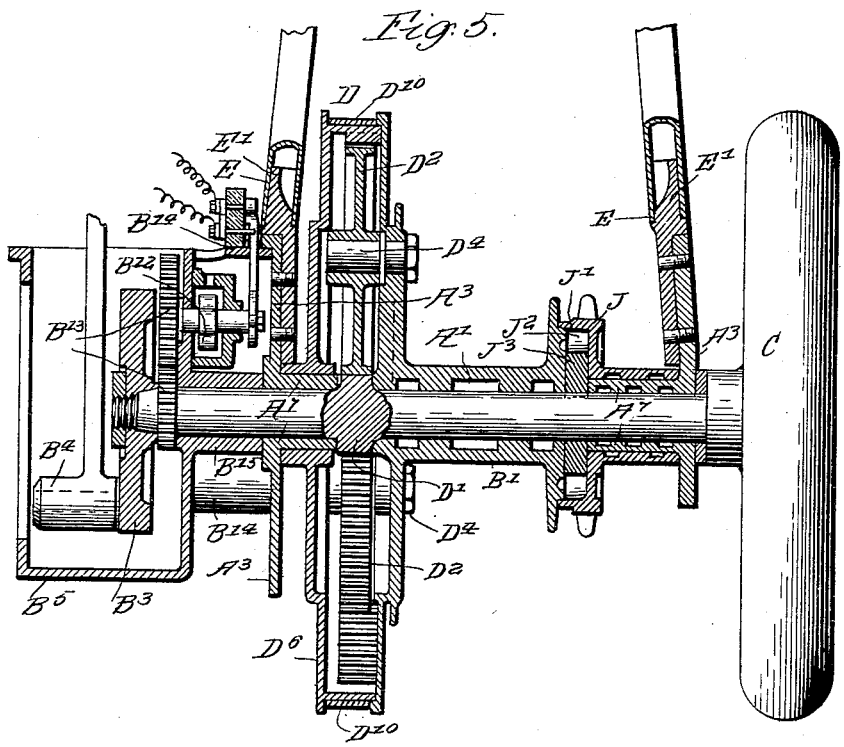
Figure 6:
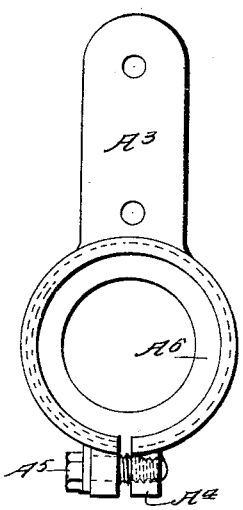

Figure 1 is a central vertical section through a motor-wheel constructed according to this invention and shows one method of attachment to the front fork of a cycle. Fig. 2 is a section of the same on the line 2 2 of Fig. 1. Fig. 3 is a perspective view showing one method of applying the motor-wheel to a tricycle. Fig. 4 is a perspective view showing another method of doing the same. Fig. 5 is a central vertical section of the driving and starting mechanism shown in Fig. 4. Fig. 6 shows the application of a motor-wheel as the rear wheel of a bicycle. Fig. 7 is a longitudinal section through the carbureter-tank, and Fig. 8 is a detail of construction.

Like letters indicate like parts throughout the accompanying drawings.

The road or driving wheel A of the motor-wheel (illustrated in Figs. 1 and 2) is constructed after the manner of an ordinary cycle-wheel and made sufficiently stout to withstand the additional wear and tear caused by its motor. Its hub $A'$ is made hollow throughout. A motor B is arranged on one side of the wheel A, and the motor-shaft $B'$ is passed through the hub $A'$ and provided on the other side of the wheel A with a fly-wheel C, which acts as a counterpoise to the weight of the motor B. The ends of the hub $A'$ are provided with ball-bearings $A^2$, formed in lugs $A^3$, adapted to be bolted to the blades of a cycle-fork. Each of the lugs $A^3$ is split, preferably at its base, and provided with projections $A^4$, through which is passed a bolt $A^5$, Fig. 8. By screwing up the bolt $A^5$ the sides of the lug are tightened on the cups $A^6$ of the bearing, and thus prevent their displacement when once adjusted. The motor-shaft $B'$ is driven direct from the piston-rod $B^2$ of the motor B by means of a crank-disk $B^3$ and pin $B^4$, arranged within the crank-chamber $B^5$ of the motor, but drives the hub $A'$, and consequently the driving or road wheel A, through the medium of reducing-gear D. The reducing-gear D comprises a pinion $D'$, preferably cut on the shaft $B'$, and which engages with two wheels $D^2$, mounted on an arm $D^3$, each wheel $D^2$ being free to turn upon its stud or pivot $D^4$, by which it is secured to the arm $D^3$. The arm $D^3$ is provided with an extension or sleeve $D^5$, which acts as a bearing-surface for the shaft $B'$ and to which the hub $A'$ is fixed in any convenient manner. An annular internally-toothed wheel $D^6$ is secured to one of the lugs $A^3$ and surrounds and engages with the wheels $D^2$. When in operation, this wheel $D^6$ acts as a fixed point of bearing for the wheels $D^2$, as hereinafter described. The whole of the gear, which, as may be clearly seen from the drawings, Figs. 1 and 2, lies within the outer annular wheel $D^6$ is completely covered in by the plate $D^7$, held in position over the open side of the annular wheel $D^6$ by means of bolts $D^8$, which pass through the plate and secure it to lugs $D^9$, with which the wheel $D^6$ is provided. The motor is of the well-known De Dion type, and, apart from the method of applying it to the motor-wheel, forms no part of this invention. The combustible mixture is supplied to the cylinder by a pipe $B^6$ and enters through a suction-valve $B^7$. The charge is ignited by the tube $B^8$, rendered incandescent by a burner in the well-known manner, or electric ignition may be used. The exhaust-gases pass out by the exhaust-valve $B^9$ through the pipe $B^{10}$ and silencer $B^{11}$. The exhaust-valve is operated by a cam $B^{12}$, geared to the motor-shaft $B'$ by pinions $B^{13}$. The crank-chamber $B^5$ of the motor is provided with a circular flanged projection $B^{14}$, by which it is secured to the plate $D^7$ of the annular wheel $D^6$. This circular flanged projection is cut away at the lower side for the sake of lightness. A sleeve or hollow extension $B^{15}$ is secured to or cast on the crank-chamber $B^5$ and forms a bearing for the end of the motor-shaft $B'$.

From the above description it will be seen that in applying the motor-wheel to an ordinary cycle-fork it is only necessary to secure the lugs $A^3$ to the blades of the fork, when all the parts will be held in place. This may be done by cutting off the ends of the blades, as at E, and brazing in lugs, such as $E'$, to which the lugs $A^3$ may be bolted. By thus securing the lugs $A^3$ all the other parts of the motor-wheel are, as stated above, held in position; but the motor may be further secured, if desired, by means of a bracket, such as $E^2$, which may be used as a stay between the upper part of the motor and the blade of the cycle-fork.

The operation is as follows: The motor having been started causes the shaft $B'$, and consequently the pinion $D'$, to rotate at a high speed. The wheels $D^2$, by means of their engagement with the pinion $D'$, are also made to revolve on their pivots $D^4$; but owing to their engagement with the fixed wheel $D^6$ they are compelled to travel around the pinion $D'$ as they revolve, carrying with them the arm $D^3$, upon which they are mounted. As has been described above, the arm $D^3$ is provided with an extension or sleeve $D^5$, which carries the hub $A'$ of the wheel A fast upon it, and thus the wheel A is caused to rotate in the same direction as the shaft $B'$, but at a reduced speed.

Fig. 3 shows a motor-wheel arranged as in Figs. 1 and 2 applied as the front wheel of a tricycle. The carbureted air, lubricating-oil, and fuel for the burner for the ignition-tube are supplied from a common carbureter-tank F, supported above the wheel A from the cycle-fork by a bracket. (Not shown in the drawings.) The internal arrangement of the tank F is shown in Fig. 7. The tank is divided into three compartments $F'$ $F^2$ $F^3$ by partitions $F^4$ $F^5$. The lubricating-oil is carried in the compartment $F'$, and may be fed to the parts needing lubrication by a pipe, which may communicate with the cock $F^6$. The carbureter is arranged in the compartment $F^2$ and is of known construction, and in itself forms no part of the present invention. The carbureter is provided with the usual plug-valves $F^7$ $F^8$ for regulating the admission of air to the vapor from the oil or spirit contained in the carbureter and the admission of the combustible charge to the pipe $B^6$ and thence to the motor, respectively. The valve $F^8$ is operated by the usual handle $F^9$, Fig. 3; but the valve $F^7$ is controlled by a lever $F^{10}$, which carries a threaded link $F^{11}$. The link $F^{11}$ is received by a correspondingly-threaded sleeve $F^{12}$, which is connected by a swivel-joint to a bracket $F^{13}$, fixed to the upper part of the carbureter. The sleeve $F^{12}$ is provided with an enlarged portion $F^{14}$, by which it may easily be rotated, so as to screw more of the link $F^{11}$ into or out of it according to the direction it is desired to operate the valve. As this valve requires nice adjustment this arrangement for its control is to be preferred to the usual handle as used for the valve $F^8$. The oil for the burner is carried in the compartment $F^3$, which is provided with the usual force-pump $F^{16}$, by which a slight air-pressure may be made to bear upon the surface of the oil. The oil passes to the burner G by a pipe $G'$, controlled by a cock $F^{17}$ at the bottom of the tank F. The burner G is surrounded by a suitable casing $G^2$, which also incloses the ignition-tube in the usual well-known manner. To avoid carrying an additional lamp to meet the requirements of any act compelling the riders or drivers of road-vehicles to carry a light, the lamp-casing $G^2$ may be provided with one or more apertures $G^3$, closed by plain or colored glass or talc. A lever H is provided within easy reach of the rider and communicates, by means of a link $H'$ and lever $H^2$, with the exhaust-valve $B^9$. The lever $H^2$ is pivoted at $H^3$, Fig. 2, and the opposite end to that to which the link $H'$ is connected is bifurcated and engages with the valve-rod or part which operates the valve-rod, Fig. 1, so that by raising the lever H the exhaust-valve $B^9$ is immediately opened. A second lever $H^4$ similarly arranged operates a band-brake on the rear axle of the tricycle in any well-known manner.

The operation of the motor-wheel has been already described. The tricycle is provided with the ordinary pedal and crank driving mechanism, and the motor is started by pedaling the whole machine forward. To render this less laborious, a cock I is provided at the top of the cylinder and when open permits the ingress and egress of air to and from the cylinder, and thus reduces the suction of the piston. When the motor is started, the cock I is closed. A lever I', arranged within easy reach of the rider at the side of the carbureter-tank F and connected by a connecting-rod $I^2$ to the lever which controls the cock I permits the rider to open or close the said cock while mounted. If preferred, the cock I may be dispensed with and the exhaust-valve opened slightly by means of the lever II until the motor is started.

Figs. 4 and 5 illustrate the application of the motor-wheel as a rear driving-wheel of a tricycle. The tricycle shown is of the well-known "Olympia" tandem type, and in itself forms no part of the present invention. The general arrangement of the motor-wheel is the same as that described with reference to Figs. 1, 2, and 3; but some details are slightly modified and mechanism is added for starting the motor either with or without moving the whole tricycle. The hub A' of the wheel A is in this case not mounted in ball-bearings, and does not extend through the lugs $A^3$, but is mounted free on the motor-shaft B', and the lugs $A^3$ are provided with plain bearings $A^7$, in which the shaft B' runs. The reducing-gear D is placed between the lug $A^3$ and the hub A' of the wheel A, and the lug $A^3$ is enlarged to receive the flanged circular extension $B^{14}$ of the motor B, which is thus bolted direct upon it.

To enable the motor to be started without imparting motion to the whole tricycle, the wheel $D^6$ of the gear D is mounted free upon the outside of the bearing $A^7$, formed on the lug $A^3$, to which the motor is attached, and is provided on its outer periphery with a band-brake $D^{10}$, by which it may at any time be held stationary or allowed to run idle. The wheels $D^2$ are mounted direct upon the spoke-flange of the wheel A, the flange being made sufficiently large for this purpose, thus dispensing with the arm $D^3$. The gear D is shown in Fig. 5 as arranged for three wheels $D^2$. Any number of wheels $D^2$ may, in fact, be used for this form of gear, so that the pinion D' may be supported all around, if desired. On that side of the hub A' opposite to that upon which the gear D is arranged is mounted a sprocket-wheel J, which may be driven when required by the usual chain-and-pedal mechanism with which the tricycle is provided. The sprocket J is provided with an annular recess J' and is mounted free upon the extension $A^7$ of the lug $A^3$. The sprocket is thus free to turn in either direction and is independent of the hub A', and consequently the wheel A. Within the recess J' is arranged the usual well-known form of roller-and-cam friction-clutch, having rollers $J^2$ and a cam $J^3$, which is fast upon the motor-shaft B'. The operation of this starting mechanism is as follows: Presuming it is desired to start the motor without moving the whole tricycle the rider slacks the band-brake $D^{10}$ and pedals forward as if to propel the tricycle. When pedaling in this direction, the sprocket J engages the cam $J^3$ by means of the rollers $J^2$ and causes the motor-shaft B' to which the cam is keyed or otherwise secured to revolve. The motor B will thus be started, but no motion will be imparted to the road-wheel A, as the pinion D' of the connecting-gear D, although revolving, only causes the wheels $D^2$ to revolve and drive around the wheel $D^6$. The moment, however, the band-brake $D^{10}$ is tightened, so that the wheel $D^6$ is held stationary, the wheels $D^2$ will commence to travel around the pinion D', as before described, thus causing the hub A' upon which they are carried to revolve.

If preferred, the band-brake $D^{10}$ need not be slackened for starting; but the motor may be started and the tricycle propelled forward at the same time. It will be understood that as soon as the motor is started the pedals may be held stationary and the friction-clutch allowed to overrun.

The carbureter-tank F is arranged above the wheel A, as in the case in which the motor-wheel is described as used for the front wheel of a tricycle, and is supported from the rear fork of the machine by a bracket $F^{18}$. The motor is in this case provided with the well-known De Dion electric-ignition device, which, however, forms no part of the present invention. The batteries for the ignition-spark are inclosed in a box or casing K, carried upon the framing of the tricycle, and the sparking-coil is inclosed in the compartment $F^3$ of the carbureter-tank F. The timing device K' is arranged at the side of the motor B, the timing-cam being mounted on the same shaft as that which carries the cam for operating the exhaust-valve $B^9$ of the motor B.

The band-brake $D^{10}$ is operated by a handle $D^{11}$, within easy reach of one of the riders. The handle $D^{11}$ is threaded and receives a spindle $D^{12}$, correspondingly threaded. The spindle $D^{12}$ passes freely through a lug $D^{13}$, secured to the frame of the machine. An arm $D^{14}$, hinged or pivoted to the frame at $D^{15}$, is provided with a jaw $D^{16}$, which receives the end of the spindle $D^{12}$ and is hinged to it by a pin $D^{17}$, passed through the jaw $D^{16}$ and spindle $D^{12}$. The spindle $D^{12}$ is thus prevented from turning when the handle $D^{11}$ is revolved, but is connected to the lever $D^{14}$ by a hinge-joint. A wire $D^{18}$, attached at one end to the end of the spindle $D^{12}$ or to the jaw end of the lever $D^{14}$, is connected at its other end to a lever $D^{19}$, to which both ends of the band-brake $D^{10}$ are attached. The lever $D^{19}$ is pivoted to a lug on the frame at $D^{20}$, and one end of the band-brake $D^{10}$ is connected to the lever $D^{19}$ on one side of the pivot $D^{20}$, and the other end is connected at $D^{21}$ to that portion of the lever which projects beyond the pivot $D^{20}$.

The operation of the band-brake is effected as follows: When the handle $D^{11}$ is rotated in one direction, the spindle $D^{12}$ is drawn up through it by means of its thread, and thus raises the end of the lever $D^{14}$ and puts a tension on the wire $D^{18}$. The lower end of the lever $D^{19}$ is thus drawn upward, together with the end of the band-brake $D^{10}$, attached on that side of the pivot $D^{20}$; but the other end of the lever $D^{19}$ is at the same time depressed and draws down the end of the band-brake $D^{10}$, attached at $D^{21}$, so that the band-brake is by this means tightened from both ends. When the handle $D^{11}$ is revolved in the opposite sense, the spindle $D^{12}$ and end of the lever $D^{14}$ are lowered, thus slackening the wire $D^{18}$, which then permits the band-brake $D^{10}$ to fall loose.

The control of the valve $F^8$, by which the amount of carbureted air admitted to the pipe $B^6$ and thence to the cylinder of the motor B is regulated, is brought within reach of one of the riders of the tricycle by a handle $F^{19}$, arranged conveniently in front of one of the seats and having a detent $F^{20}$ and rack $F^{21}$, whereby it may be retained in any position in which it may be placed. The handle $F^{19}$ is conveniently connected by a connecting-rod $F^{22}$, a bell-crank lever $F^{23}$, and a second connecting-rod $F^{24}$ to the lever $F^9$, by which the valve $F^8$ is operated. A handle $K^2$ is also arranged within easy reach of one of the riders for completing or breaking the electric circuit from the batteries K to the electric-ignition device when desired.

The lever H for operating the exhaust is connected to the lever $H^2$, Fig. 2, by a wire $H^6$. (Not shown in Fig. 4.) The lever $H^2$ is for this purpose modified and formed as a bell-crank lever, as indicated by the dotted portion $H^5$, having the wire $H^6$ attached. (Shown in Fig. 2.) The exhaust-valve $B^9$ is opened by raising the lever H, which, pulling on the wire $H^6$, raises the forked end of the lever $H^2$. When the lever H is released, the valve closes by means of its spring and brings the lever $H^2$ back into its normal position. The wire $H^6$ may be carried along the framing from the lever H to the lever $H^2$ in any convenient manner—as, for instance, is hereinafter described with reference to Fig. 6.

Fig. 6 illustrates the application of a motor-wheel as the rear wheel of a bicycle. With the exception of one or two slight modifications the various parts are arranged as in the tricycle illustrated in Fig. 4. The carbureter-tank F, which is larger than that shown in Fig. 4, is carried by an additional piece of framing L L, built up on the rear fork of the machine and is secured to the framing L L by the bracket $F^{18}$ and one or more ties L'. If preferred, however, the carbureter-tank F may be made smaller and arranged as in the rear-driving tricycle described above. The band-brake $D^{10}$ and exhaust-valve $B^9$ are operated as described with reference to the rear-driving tricycle, one or two additional pulleys and bell-cranks being provided to guide the operating-wires. The handles $D^{11}$ and $F^{19}$ for operating the band-brake and valve, respectively, are arranged at the head of the machine. The wire $D^{18}$ from the lever $D^{14}$ is passed over a pulley at $D^{22}$ and over a second pulley at $D^{23}$ to the lever $D^{19}$. The bell-crank $F^{23}$, operated by the lever $F^{19}$, is connected to the link $F^{24}$ (which operates the lever F for the purpose described above) by means of two additional links and bell-cranks $F^{25}$ $F^{26}$ and $F^{27}$ $F^{28}$, respectively. The link H' and handle H for operating the exhaust-valve are arranged as an ordinary plunger-brake, the shoe or other brake mechanism being attached to the end of the link. The link H' is provided with a projection $H^7$, which engages a bell-crank $H^8$, pivoted at $H^9$ to the frame of the machine. A wire $H^{10}$ connects the bell-crank $H^8$ to a lever $H^{11}$, pivoted at $H^{12}$, and to the lever $H^{11}$ one end of the wire $H^6$ is attached, the other end of which is, as already described, secured to the end $H^5$ of the valve-operating lever $H^2$. The link H' may be adjusted, as is usual, with ordinary plunger-brakes, so that by proper adjustment the lever H may be made to open the exhaust-valve $B^9$ only when slightly raised, but when fully raised may be arranged to apply any well-known form of tire or rim brake.

The cock I may be operated by the rider reaching slightly behind the saddle, or it may be connected by suitable links and cranks to a handle arranged in front on the handle-bars or head of the machine.

It will be understood that the various connections between the operating-handles and valve or other parts operated by such handles may be variously arranged to suit the requirements of different riders or different forms of machines to which it may be desired to apply the motor-wheel; also, the motor-wheel may be applied as the front wheel of a bicycle and arranged as in the front-driving tricycle described with reference to Fig. 3, and the frame may be either in the form of a lady's or gentleman's machine. The rear-driving tricycle, too, need not be of the Olympia pattern and may be adapted to carry one or any other number of persons within reasonable limits.

Further, the hub A' may be provided with ball-bearings instead of plain bearings, as shown in Figs. 4 and 5, and ball-bearings may, if preferred, be provided between the shaft B' and the hub A' in any of the arrangements described; also, the gear D, with its band-brake $D^{10}$, may be arranged outside the fork between the motor B and the lug $A^3$ in a similar manner to the arrangement shown in Figs. 1, 2, and 3, provision being, however, made for the wheel $D^6$ to revolve when the band-brake is slack. Any of the above arrangements may be also provided with more than one set of speed-gear, if desired, so that different speed may be obtained by tightening the band-brake on the set of gear required and slackening that or those on the set or sets not required. The different sets of gear may be arranged side by side or one or more on one side of the wheel, and ditto on the other, as found convenient.

The motor-wheel might be applied to other forms of vehicles besides cycles. To do this, it is only necessary to provide the vehicle to which the motor-wheel is to be applied with one or more supports to receive the lugs $A^3$. A vehicle could thus be provided with four motor-wheels, two being arranged to steer, or ordinary steering-wheels could be used, and two motor-wheels for driving. The motor-wheels may, in fact, if desired, be applied wherever an ordinary road-wheel is at present used. Again, the same arrangement as is herein described might be used for driving through the medium of other machinery. Thus the mechanism arranged, as described, might be secured beneath a vehicle, the road-wheel A removed, and a fast and loose pulley mounted in its place. The driving-pulley may then be arranged to drive by means of belting onto any desired form of gear.

I have used in the claims the term "rigid member" and I desire it understood that this term is not restricted in its application to a fixed part of the frame—such, for instance, as the blades of a cycle-fork or other similar parts to which the motor may be attached—but is intended to cover any member bearing such relation to the driving mechanism as to adapt it to so connect the motor-cylinder and the motor-shaft as to entirely obviate any end thrust between the piston and cylinder being taken up by the blade of the fork or other equivalent member of the vehicle-frame. Thus, as is seen in Fig. 1 of the drawings, the rigid member is the crank-chamber of the cylinder provided with a bearing through which the motor-shaft is projected. In this case all end thrust between the cylinder-piston and the crank is sustained by the cylinder and the crank-chamber, which are bolted together, and not by the blade of the fork to which the cylinder is secured by the light bracket $E^2$, the object of which last-named part is merely to keep the cylinder in a vertical position.

I claim—

1. In a motor-driving apparatus, the combination with a driving-wheel, of a motor mounted at one side of it, a motor-shaft, bearings on the driving-wheel for the motor-shaft, a rigid member connecting the motor-cylinder with the motor-shaft, a fly-wheel operatively connected with the motor-shaft, mounted concentrically with the driving-wheel and at the other side of it, and speed-gear operatively connecting the motor-shaft and the driving-wheel; substantially as set forth.

2. In a motor-driving apparatus, the combination with a driving-wheel, of a hollow axle or hub therefor, a motor mounted at one side of that wheel, a motor-shaft passed through the hub, bearings on the hub for the motor-shaft, a rigid member connecting the motor-cylinder with the motor-shaft, a fly-wheel mounted concentrically with the driving-wheel and at the other side of it and operatively connected with the motor-shaft, and speed-gear operatively connecting the motor-shaft and the driving-wheel; substantially as set forth.

3. In a motor-driving apparatus, the combination with a driving-wheel, of a hollow axle or hub, bearings to support that hub, a motor mounted at one side of the driving-wheel, a motor-shaft extending through the hub, bearings on the hub for the motor-shaft, a rigid member connecting the motor-cylinder with the motor-shaft, a fly-wheel operatively connected with the motor-shaft and concentric with the driving-wheel and at the side thereof opposite to that at which the motor is placed, a central pinion on the motor-shaft, a gear-wheel pivoted on the hub and geared with the pinion, and an annular gear-ring geared with that gear-wheel; substantially as set forth.

4. In a motor-driving apparatus, the combination with a driving-wheel, of a hollow axle or hub, bearings to support that hub, a motor mounted at one side of the driving-wheel, a motor-shaft extending through the hub, bearings on the hub for the motor-shaft, a rigid member connecting the motor-cylinder with the motor-shaft, a fly-wheel operatively connected with the motor-shaft and concentric with the driving-wheel, and at the side thereof opposite to that at which the motor is placed, a central pinion on the motor-shaft, a gear-wheel pivoted on the hub and geared with the pinion, an annular gear-wheel geared also with the said pivoted wheel, and means for controlling the rotation of the annular wheel, for the purpose set forth.

In witness whereof I have hereto set my hand in the presence of the two subscribing witnesses.

HENRY JOHN LAWSON.

Witnesses:
ALFRED MOSLEY HAYWARD,
LAUCHLAN KENNEDY.